(12) United States Patent
Kramer et al.

(10) Patent No.: US 6,279,391 B1
(45) Date of Patent: Aug. 28, 2001

(54) ELECTRICAL ENGINE FIRING PULSE CONVERTER

(75) Inventors: Dennis A. Kramer, Troy; Ronald N. Brissette, Lake Orion; Christopher S. Keeney, Troy, all of MI (US); Jack R. McKenzie, Hendersonville, NC (US); Brian J. Mueller, Lake Orion; Dale Bell, Ortonville, both of MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/427,472

(22) Filed: Oct. 26, 1999

(51) Int. Cl.[7] .................................................. G01M 15/00
(52) U.S. Cl. ............................................................ 73/118.1
(58) Field of Search ................................. 73/118.1, 116, 73/117.2, 117, 117.3, 119 R

(56) References Cited

U.S. PATENT DOCUMENTS

| | | | |
|---|---|---|---|
| 4,838,077 | * | 6/1989 | Shifflet et al. ........................ 73/118.1 |
| 5,004,981 | * | 4/1991 | Hashimoto et al. . |
| 5,265,467 | * | 11/1993 | Baer ...................................... 73/118.1 |
| 5,855,534 | * | 1/1999 | Bates . |
| 5,893,892 | * | 4/1999 | Loeffler . |

* cited by examiner

Primary Examiner—Eric S. McCall
(74) Attorney, Agent, or Firm—Carlson, Gaskey & Olds

(57) ABSTRACT

Systems are provided which retard rotation of a driveline at times associated with an engine firing pulse from an engine driving the driveline to reduce torque peaks. In one system, a control monitors rotation of a drive shaft, to provide an indication of when an engine firing pulse should occur. The control selectively closes a switch to power a coil such that the coil retards rotation of the driveline, and generates electricity for use elsewhere. In a second embodiment, circumferentially spaced magnets are mounted on a driveline and move past a coil at a selected circumferential location. The coil resists the rotation of the shaft, retarding torque peaks. The embodiments thus reduce or eliminate imbalances in rotation of the shaft due to engine firing pulses.

9 Claims, 1 Drawing Sheet

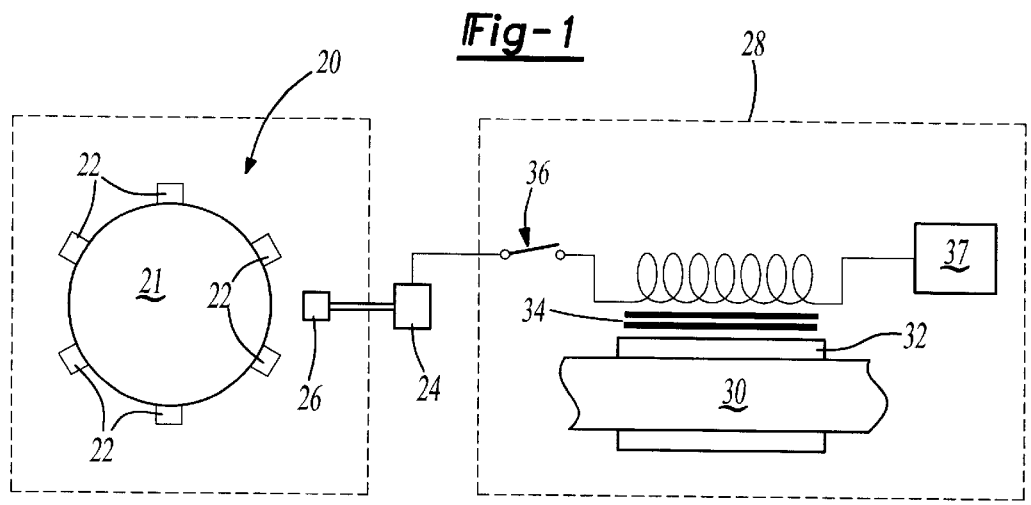
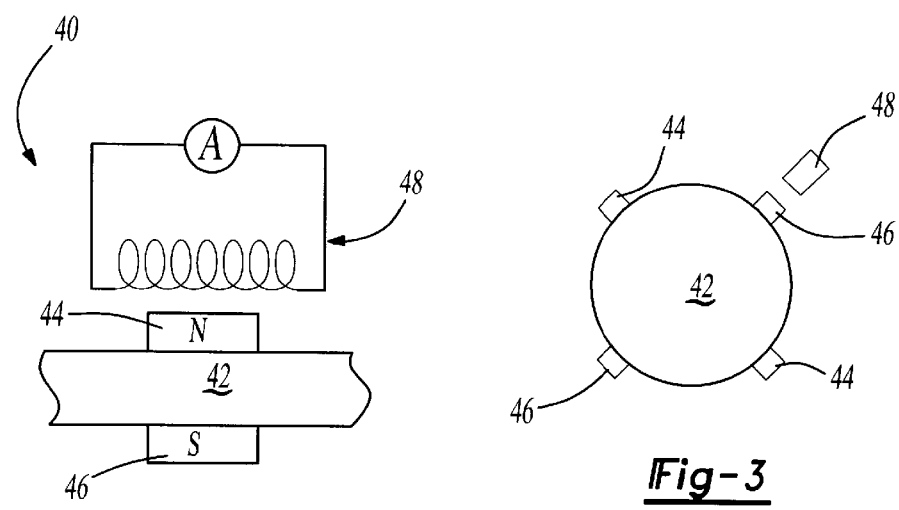

ELECTRICAL ENGINE FIRING PULSE CONVERTER

BACKGROUND OF THE INVENTION

This invention discloses a means of retarding pulses in a vehicle drive train which are typically associated with engine firing.

Modern vehicles are typically driven by an engine which has a number of firing locations during each rotation of crank shaft. Thus, during each rotational cycle of the crank shaft, there are several locations where a particular cylinder is being "fired". The crank shaft drives a transmission, typically through a clutch. The several engine firing pulses result in a number of peaks in the torque being transmitted through the drive shaft. These peaks are associated with undesirable vibration, etc.

Thus, it would be desirable to eliminate the peaks which occur associated with the separate cylinder firings.

SUMMARY OF THE INVENTION

In the disclosed embodiment of this invention, a shaft rotation retarder is associated with a rotating shaft of a vehicle drive train. The shaft rotation retarder is constructed such that it is operable to retard rotation at positions associated with the firing peaks of the vehicle engine, but not retard rotation during other times.

In one embodiment, a number of elements are positioned on the engine drive shaft. The elements are positioned at locations to be associated with the firing pulses. A control senses rotation of those elements, and is thus able to determine when the firing pulses will occur. The control also drives a switch on an electro magnetic circuit which can selectively apply magnetic resistance to rotation of the drive shaft. The shaft is preferably provided with a permanent magnet on its outer periphery associated with the electromagnet.

When the engine is operating, the control opens and closes a switch used to power the electromagnet at times associated with the firing pulses. The switch is maintained closed for a period of time which corresponds to the period of time where the imbalance and torque from the engine firing pulse is at its maximum. The switch is then opened.

The electromagnet thus selectively retards rotation of the shaft during periods of the rotational cycle associated with the peaks due to the firing pulses. In this way, imbalances during each rotational cycle of the drive shaft are reduced or eliminated. Further, the resistance in the electromagnet created by the closing of the switch generates current which may be utilized for other purposes, and may be stored and later utilized for other purposes. Thus, this invention not only eliminates the discontinuities in the rotation on each cycle, but also generates electricity.

In a second embodiment, the driveline has magnets mounted at circumferential locations associated with the engine firing pulses. That is, magnets are mounted at circumferentially spaced locations on the driveline at a location spaced from the engine.

The magnets are associated with an electric circuit and coil which is positioned at one circumferential location, and offers resistance to rotation as the magnets pass that location. The magnets approach the coil at a firing pulse. In this way, the peaks are again reduced or eliminated.

These and other features of the present invention can be best understood from the following specification and drawings, the following of which is a brief description.

BRIEF DESCRIPTION THE DRAWINGS

FIG. 1 is a schematic view of a first embodiment of the present invention.

FIG. 2 shows a second embodiment of the present invention.

FIG. 3 is a cross-sectional view through the FIG. 2 embodiment.

DETAILED DESCRIPTION OF THE DRAWINGS

An engine 20, shown schematically, incorporates a shaft 21 driving a plurality of elements 22 which are positioned to be read by a control 24 through its sensor 26. The elements 22 and the sensor 26 may be magnetic, optical, or any other way of identifying passage of one of the elements 22 by sensor 26. The elements 22 are associated with the shaft 21 at locations such that when they pass sensor 26, an indication is provided to the control 24 that an engine firing point is approaching or has arrived.

A vehicle driveline 30 has a permanent magnet 32 positioned on its outer periphery. As shown, the portion of the vehicle driveline incorporating this system may be mounted within the clutch 28, shown schematically. As known, a transmission is typically mounted downstream of the clutch 28 relative to the engine, and this system may also be incorporated into the transmission. However, the vibration dampeners typically utilized in the prior art are often incorporated into the clutch, and it is presently envisioned that the clutch would be the most preferred location for the system of the present invention.

An electric coil 34 is positioned adjacent to the permanent magnet 32. As shown, a switch 36 selectively opens and closes a connection to the coil 34, and is controlled by control 24.

In the present invention, the control 24 takes sensor readings from sensor 26 to determine when a firing pulse is occurring. At that time, the switch 36 is selectively closed to power coil 34. Coil 34 thus resists rotation of the permanent magnet 32. After it is determined that the firing pulse would have diminished, the switch 36 is opened. The amount of time the switch 36 is closed is on a relatively small order, and can be easily determined for each type engine and vehicle which incorporates the present invention.

The coil 34, when powered, resists rotation of the permanent magnet 32, and thus, the shaft 30. This thus retards the torque peaks provided by the engine firing pulses, and smoothes out the torque being provided to the driveline 30, and the downstream component such as the transmission. Further, the coil 34 will generate electric current when it has its switch 36 closed. This energy can be stored such as in battery 37, and can be utilized to drive other system components.

The present invention thus not only eliminates pulses in the torque provided to the driveline, but also generates electricity.

FIG. 2 shows a further embodiment 40 wherein the driveline 42 has permanent magnets 44 and 46 mounted at spaced circumferential locations. The circumferential locations are carefully controlled such that they are associated with when the engine firing pulses would occur. Further, the circumferential extent of the magnets is also typically designed such that their rotation past a coil 48 will occur for about the same time as the engine firing pulses.

The coil 48 is powered permanently, such that as the magnets 44 and 46 pass, it resists or retards the rotation. This eliminates the pulses such as in the first embodiment.

Preferred embodiments of this invention have been disclosed, however, a worker of ordinary skill in this art would recognize that many modifications would come within the scope of this invention. For that reason, the following claims should be studied to determine the true scope and content of this invention.

What is claimed is:

1. A method of eliminating pulses on a vehicle driveline comprising the steps of:

(1) providing a vehicle driveline driven by an engine having spaced firing pulses; and (2) actuating a system for slowing rotation of said driveline at selected points during rotation of said driveline, said selected points being selected to be associated with said engine firing pulses of said engine for eliminating pulses in rotational drive.

2. A method as recited in claim 1, wherein a control device is associated with a drive shaft for a vehicle, and is able to sense an indication from said drive shaft of when an engine firing pulse will occur, device being operable to close a switch and create retardation of rotation of said driveline at points associated with said engine firing pulses.

3. A method as recited in claim 2, wherein said switch is maintained closed for a period of time which is selected to correspond to a maximum peak of imbalance in a torque applied to said driveline due to an engine firing pulse.

4. A method as recited in claim 1, wherein said driveline is provided with a plurality of circumferentially spaced magnets associated with an electric coil, said magnets being positioned on said driveline at locations to correspond to the point in a cycle of rotation of said driveline where an engine firing pulse is to occur.

5. A system for eliminating pulses in rotation al drive provided to a driveline due to engine firing pulses comprising:

a vehicle driveline provided with at least one magnet;

a retarder mounted adjacent to said magnet; and said retarder being operable to retard rotation of said driveline at points associated with an engine firing pulse of an engine connected to drive said driveline for eliminating pulses in rotational drive.

6. A system as recited in claim 5, wherein said retarder is mounted within a clutch driven by a drive shaft of a vehicle engine.

7. A system as recited in claim 6, wherein said drive shaft includes a plurality of indicators for providing an indication to a sensor of a circumferential location in a cycle of rotation of said drive shaft, said indicators being positioned to provide an indication to a control device receiving said sensor information of the occurrence of an engine firing pulse, and said control device then being operable to selectively close a switch to provide retardation.

8. A system as recited in claim 7, wherein said control device maintains said switch closed for a period of time associated with a time period of a pulse imbalance associated with said engine firing pulse.

9. A system as recited in claim 5, wherein said driveline is provided with a plurality of circumferentially spaced magnets, and said retarder includes a coil positioned radially outwardly of a shaft at least at one circumferential location, such that as said magnets pass said retarder, rotation of said driveline is retarded.

* * * * *